May 27, 1969
D. SCARAMUCCI
3,446,475
BALL VALVES WITH RETAINED SEALS
Filed Feb. 10, 1966
Sheet 1 of 2
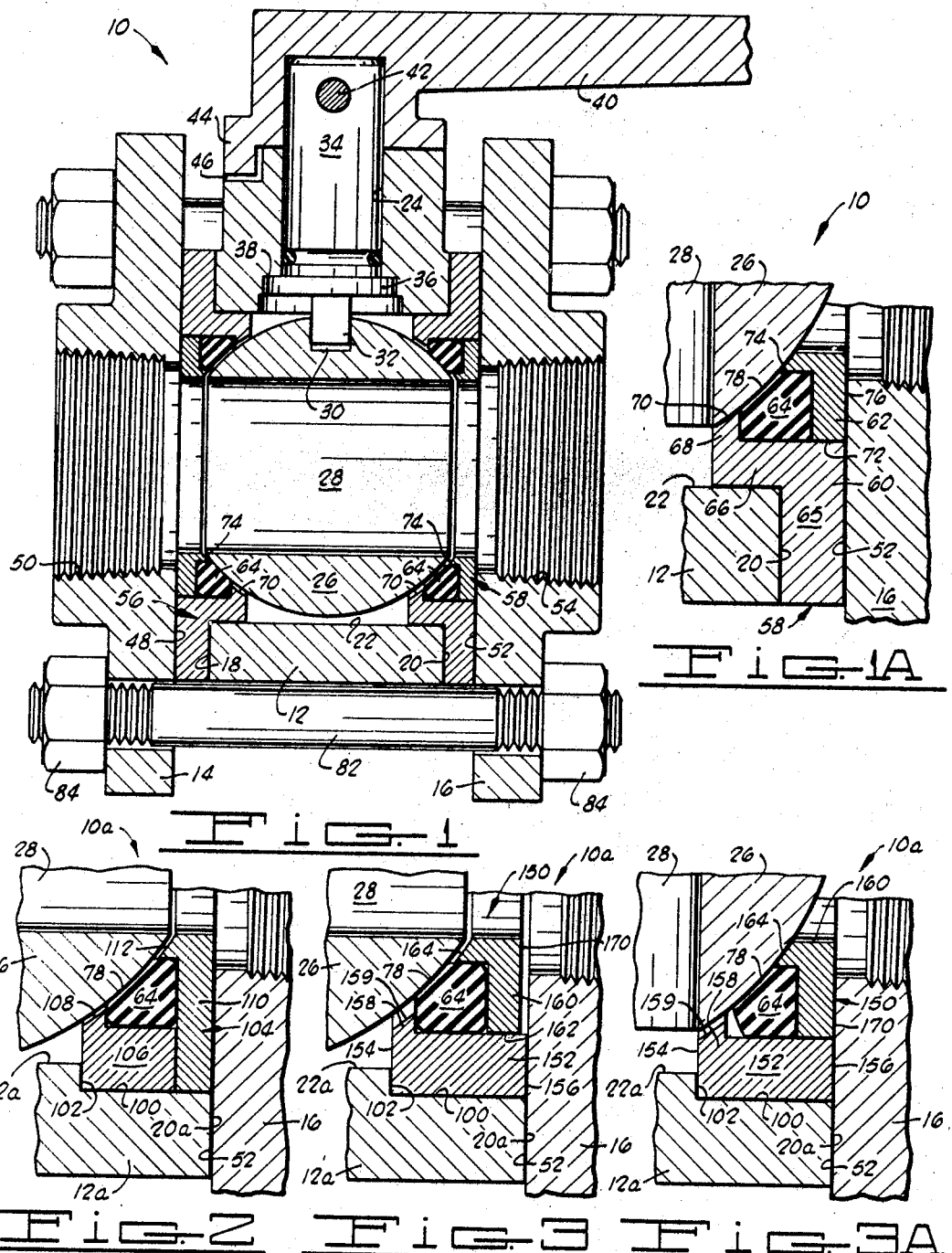
INVENTOR.
DOMER SCARAMUCCI
BY
Dunlap and Laney
ATTORNEYS INVENTOR.
DOMER SCARAMUCCI
BY
Dunlap and Laney
ATTORNEYS

United States Patent Office 3,446,475
Patented May 27, 1969

3,446,475
BALL VALVES WITH RETAINED SEALS
Domer Scaramucci, Oklahoma City, Okla., assignor to Balon Corporation, Oklahoma City, Okla., a corporation of Oklahoma
Filed Feb. 10, 1966, Ser. No. 526,571
Int. Cl. F16k 5/06, 27/06
U.S. Cl. 251—151                 9 Claims

ABSTRACT OF THE DISCLOSURE

A ball valve having a multi-part seat assembly, particularly at the downstream end of the valve. The seat assembly comprises an elastomer ring to provide the primary seal, and the elastomer ring is held by two metal rings which form secondary, metal-to-metal seals.

---

This invention relates generally to improved ball valves. More particularly, but not by way of limitation, this invention relates to an improved between flange ball valve and to improved seals for use therein.

Ball valves constructed in the past have utilized various forms of annular reinforcing, retaining, and/or supporting members that are generally constructed from a relatively rigid material. The supporting members also provide, in many of the valves, a seat for the valve ball.

For the most part, the annular support or retainer members have been of one of two types. They have either been rigidly mounted in the valve body in sliding engagement with the valve ball or they have been loose or floating in the valve body and engage the valve ball only upon deformation of the resilient seal member.

Much difficulty has been encountered when using the loose or floating type of supporting members. The difficulty results from the tendency of the members to become cocked in the valve body. As a result of the cocking of the reinforcing members, a force is exerted on the valve ball resulting in binding the valve ball, whereby excessive torque is required to rotate the valve ball between the open and closed positions of the valve.

This invention generally provides an improved ball valve comprising: a valve body having an upstream end face, a downstream end face, and a bore extending therethrough intersecting the end faces; a valve ball movably positioned in the bore, the valve ball having a port extending therethrough and being rotatable between an open position wherein the port and bore are aligned and a closed position wherein the port and bore are disaligned; operating means operably connected with the valve ball for rotating the valve ball between the open and closed positions; a resilient, annular seal member disposed in the bore adjacent one of the end faces and encircling a portion of the bore, the seal member having a surface engaging the valve ball; a first annular member engaging the valve body in the bore and engaging the seal member to prevent movement of the seal member into the bore; a second annular member including an annular seat portion having a surface engageable with the valve ball upon deformation of the seal member, the second annular member engaging the seal member to prevent movement of the seal member out of the valve body; and, a flanged connection member having an end face and an opening extending therethrough intersecting the end face, the opening being aligned with the bore when the connection member is assembled in the valve, the end face on the connection member being arranged to engage the second annular member to prevent movement of the second annular member away from the valve body.

One object of this invention is to provide an improved valve ball incorporating an improved seal arrangement that prevents extrusion of the resilient seal member either into or out of the valve.

Another object of the invention is to provide an improved valve ball that functions to provide a fluid-tight shut-off even when the resilient seal members are rendered inoperable.

A further object of the invention is to provide an improved ball valve that can be easily and economically manufactured.

Another object of the invention is to provide an improved valve ball and improved seals therefor for use between flanged connection members.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a ball valve constructed in accordance with the invention;

FIG. 1A is an enlarged, fragmentary cross-sectional view of a portion of the ball valve of FIG. 1, illustrating the valve ball in the closed position;

FIG. 2 is an enlarged, fragmentary cross-sectional view similar to FIG. 1A, but illustrating another embodiment of seal assembly also constructed in accordance with the invention;

FIG. 3 is an enlarged, fragmentary cross-sectional view similar to FIG. 2, but illustrating still another embodiment of seal assembly;

FIG. 3A is an enlarged, fragmentary cross-sectional view somilar to FIG. 3, but illustrating the position of the seal when the valve ball is in the closed position and shifted relatively downstream;

Embodiment of FIG. 1

Figure 4:
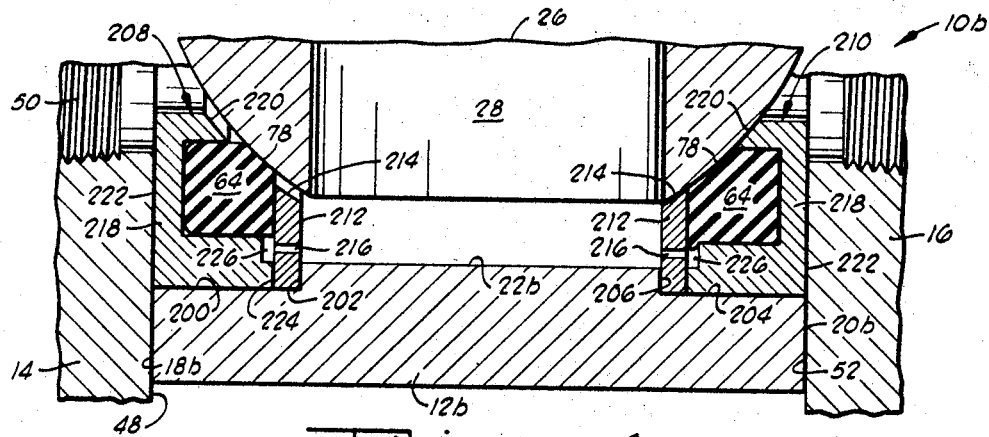
FIG. 4 is an enlarged, fragmentary cross-sectional view illustrating another embodiment of seal and showing both a portion of the upstream and downstream seals with the valve ball in the closed position and shifted relatively downstream.

Referring to the drawing and to FIG. 1 in particular, shown therein and generally designated by the reference character 10 is a ball valve constructed in accordance with the invention. The ball valve 10 includes a valve body 12 disposed between a pair of flanged connection members 14 and 16.

The valve body 12 includes an upstream end face 18, a downstream end face 20, and a bore 22 extending therethrough and intersecting the end faces 18 and 20. An aperture 24 extends transversely through the valve body 12 intersecting the bore 22.

A valve ball 26 having a port 28 extending therethrough is movably mounted in the bore 22. The exterior of the valve ball 26 is provided with a rectangular recess 30 that is sized to receive the rectangular lower end 32 of a valve operating member 34. It will be understood by those skilled in the art that the recess 30 is longer than the rectangular end 32 to permit movement of the valve ball 26 relatively along the bore 22 when the valve ball 26 is in the closed position as illustrated in FIG. 1A.

The valve operating member 34 extends through the aperture 24 and includes an exterior flange 36 that is in engagement with a downwardly facing surface 38 in the valve body 12 to limit the relative upward movement of the valve operating member 34 in the valve body 12. The upper end of the valve operating member 34 extending from the valve body 12 is connected with an operating handle 40 by a pin 42.

The valve operating handle 40 includes a lug 44 arranged to engage a pair of spaced abutments 46 (only one is shown in FIG. 1) formed on the valve body 12. The engagement of the lug 44 with the abutments 46 limits the rotational movement of the handle 40, the connected valve operating member 34, and the valve ball 26 to approximately 90 degrees.

The upstream flanged connecting member 14 includes and end face 48 facing the valve body 12 and a partially threaded opening 50 extending therethrough and intersecting the end face 48. The opening 50 is in axial alignment with the bore 22 when the upstream flange connection member 14 is assembled in the ball valve 10.

The downstream flanged connecting member 16 includes an end face 52 facing the valve body 12 and a partially threaded opening 54 that extends therethrough intersecting the end face 52. The opening 54 is in axial alignment with the bore 22 when the flanged connection member 16 is assembled in the ball valve 10.

An upstream seal assembly 56 is located in the ball valve 10 between the valve body 12 and the upstream flanged connection member 14. A downstream seal assembly 58, which is identical in construction to the upstream seal assembly 56, is located in the ball valve 10 between the valve body 12 and the downstream flange connection member 16. As previously mentioned, the seal assemblies 56 and 58 are identical in construction, but as is clearly shown in FIG. 1, they are oppositely disposed therein.

Due to the identical construction of the seal assemblies 56 and 58 only the structure of the downstream seal assembly 58 will be described in detail. It will be understood that like reference characters used in describing the downstream seal assembly 58 will be applied to like parts of the upstream seal assembly 56.

The structure of the downstream seal assembly 58 is more clearly shown in FIG. 1A. As shown therein, the downstream seal assembly 58 includes a first annular member 60, a second annular member 62 and an annular seal member 64 that is preferably constructed from a relatively resilient material. The members 60 and 62 are preferably constructed from a relatively rigid material.

The first annular member 60 includes a radial flange portion 65 disposed between and in engagement with the downstream end face 20 on the valve body 12 and the end face 52 on the downstream connection member 16. An intermediate peripheral portion 66 of the first annular member has an outside diameter sized to fit closely within the bore 22 to automatically align the downstream seal assembly 58 axially with respect to the bore 22. A radial flange portion 68 on the first annular member 60 has an inner peripheral surface 70 that is engageable with the surface of the valve ball 26 upon deformation of the annular seal member 64 as will be described hereinafter.

The second annular member 62 is generally L-shaped in configuration and has an outer periphery 72 sized to slidingly fit in the first annular member 60. The second annular member 62 also includes a surface 74 that is disposed in the same spherical plane as the inner peripheral surface 70 on the first annular member 60. The surface 74 is positioned so that it will engage the exterior surface of the valve ball 26 simultaneously with the inner peripheral surface 70 upon deformation of the annular seal member 64, thereby providing additional support for the valve ball 26. It will also be noted that the second annular member 62 includes a surface 76 that is engageable with the end face 52 of the downstream connection member 16 to prevent movement of the second annular member 62 relatively out of the valve body 12.

The annular seal member 64 includes a surface 78 that is configured to sealingly engage the exterior surface of the valve ball 26. The seal members 64 (see FIG. 1) are slightly stressed upon assembly of the ball valve 10 so that the valve ball 26 is centered and held out of engagement with the surfaces 70 and 74. The space between the surfaces 70 and 74 and the exterior surface of the valve ball 26 is preferably between $5/1000$ annd $10/1000$ of an inch. Thus, the initial sealing engagement is effected only between the seal members 64 and the valve ball 26. It should also be pointed out that the seal member 64 does not fill the space defined by the members 60 and 62 and the surface of the valve ball 26.

As shown in FIG. 1, the valve body 12, the seal assemblies 56 and 58, and the upstream and downstream connection members 14 and 16, respectively, are held in assembled relationship by a plurality of threaded fasteners 82 that extend between the flanged connection members 14 and 16 externally of the valve body 12. Each end of the threaded fasteners 82 is provided with a threaded nut 84. The nuts 84 are in engagement with the flanged connecting members 14 and 16. Manifestly, tightening of the threaded nuts 84 on the threaded fasteners 82 exerts a force on the flanged connection members 14 and 16, through the radial flange portions 65 of the seal assemblies 56 and 58, to the valve body 12. Thus, it can be seen that the load exerted upon assembly of the ball valve 10 is carried by the valve body 12 as a compressive load.

*Operation of the embodiment of FIG. 1*

The ball valve 10 is illustrated in FIG. 1 as being in the open position, that is, with the port 28 in the valve ball 26 axially aligned with the bore 22 extending through the valve body 12 and with the openings 50 and 54 extending through the flanged connection members 14 and 16, respectively. With the ball valve 10 in the open position, the valve ball 26 is retained in the centered position under the influence of the biasing force exerted by the seal members 64 located in the upstream and downstream seal assemblies 56 and 58, respectively.

When it is desired to close the ball valve 10, the handle 40 is rotated approximately 90 degrees, rotating the valve ball 26 until the port 28 extending therethrough is disposed at 90 degrees relative to the elongation of the bore 22, that is, into the position illustrated in FIG. 1A. When in this position, fluid pressure exerted through the opening 50 in the upstream connection member 14 imposes a force on the valve ball 26 moving it relatively toward the downstream connection member 16 and deforming the downstream seal member 64.

The downstream movement of the valve ball 26 is possible due to the previously described relationship between the recess 30 in the valve 26 and the rectangular end portion 32 of the valve operating member 34. The downstream movement of the valve ball 26 continues until the deformation of the seal member 64 is sufficient to permit the exterior surface of the valve ball 26 to engage the surfaces 70 and 74 on the downstream seal assembly 58 as shown in FIG. 1A. When this occurs, a fluid-tight downstream seal exists between the seal member 64 and the exterior surface of the valve ball 26 and, a secondary downstream seal exists between the exterior surface of the valve ball 26 and between the surfaces 70 and 74 on the downstream seal assembly 58.

If the seal member 64 should become defective, for example, such as by becoming abraded or by destruction due to fire or overheating, the ball valve 10 will form a fluid-tight downstream seal due to the engagement between the valve ball 26 and the surfaces 70 and 74 on the downstream seal assembly 58. Since the initial space between the surface of the valve ball 26 and the surfaces 70 and 74 is only $5/1000$ to $10/1000$ of an inch, the seal member 64 located in the upstream seal assembly 56 is effective to maintain an upstream seal with the valve ball 26.

It can be appreciated from the foregoing that a valve constructed as described provides an economically constructed valve that effectively seals under the influence of extremely high pressures or when the resilient seal members 64 are destroyed. Also, a valve constructed as described provides means for centering the valve ball and forming effective upstream and downstream seals while preventing cocking of the annular members 60 and 62 to eliminate the possibility of binding the valve ball. Thus, no excessive torque will be required to rotate the valve ball 26 between the open and closed positions even in the presence of extremely high pressure.

Embodiment of FIG. 2

The fragmentary cross-sectional view of FIG. 2 illustrates a modified form of the ball valve 10 that is generally designated by the reference character 10a. As shown in FIG. 2, the valve 10a includes the valve ball 26 having the port 28 extending therethrough, the downstream flanged connection member 16, and a modified form of the valve body 12 designated by the reference character 12a. It will be understood that the valve 10a includes the necessary operating components as illustrated in FIG. 1.

The valve body 12a includes a downstream end face 20a that is in engagement with the end face 52 on the flanged connection member 16. A bore 22a extends through the valve body 12a intersecting the upstream end face (not shown) and the downstream end face 20a. A counterbore 100 is formed in the valve body 12a adjacent the end face 20a and, if desired, also in valve body 12a adjacent the upstream end face (not shown). The counterbore 100 forms an annular shoulder 102 in the valve body 12a that is in engagement with a downstream seal assembly 104.

As clearly illustrated in FIG. 2, the downstream seal assembly 104 includes a first annular member 106 that is disposed in the counterbore 100 with one end thereof in engagement with the annular shoulder 102. The first annular member 106 includes a surface 108 arranged to engage the exterior surface of the valve ball 26 as previously described in connection with the surface 70 of the seal assembly 58 of FIGS. 1 and 1A.

Also disposed in the counterbore 100 is a second annular member 110 that is in engagement with the other end of the first annular member 106 and in engagement with the end face 52 of the downstream connection member 16. A surface 112 is formed on the second annular member 110 and lies in the same spherical plane as the surface 108 of the first annular member 106 so that the surfaces 108 and 112 simultaneously engage the exterior surface of the valve ball 26. The annular members 106 and 110 are preferably constructed from a relatively rigid material.

The annular seal member 64 is disposed in the downstream seal assembly 104 with the surface 78 thereon in sealing engagement with the exterior surface of the valve ball 26. As previously mentioned, the seal member 64 is preferably constructed from a resilient material. It is also to be noted, that the seal member 64 does not fill the space provided in the downstream seal assembly 104 when the valve ball is centered and in the open position as illustrated in FIG. 2. When the valve ball 26 is in the centered position, the space between the surfaces 108 and 112 and the exterior surface of the valve ball 26 is preferably 5/1000 to 10/1000 of an inch.

The operation of the ball valve 10a is precisely the same as previously described in connection with the ball valve 10. It will also be noted in FIG. 2, that the force exerted on the valve 12a during assembly by means of the threaded fasteners 82 (see FIG. 1) is exerted as a compressive force on the valve body 12a. Furthermore, the annular members 106 and 110 provided in the downstream seal assembly 104 cannot become cocked or otherwise deformed by the assembly force or by the force exerted by the valve ball 26 and thus will not bind or restrict movement of the valve ball 26 during rotation between the open and closed positions.

Embodiment of FIG. 3

The fragmentary, cross-sectional view of FIG. 3 illustrates another embodiment of seal assembly generally designated by the reference character 150 that is located in the ball valve 10a. It will be understood that the embodiment of FIG. 3 includes the various components previously described in connection with FIG. 2 and the same reference characters will be used to designate like parts.

As illustrated in FIG. 3, the seal assembly 150 is located in the counterbore 100 formed in the valve body 12a. The seal assembly 150 includes a first annular member 152 having an end 154 in engagement with the shoulder 102 formed by the counterbore 100 and a second end 156 engaging the end face 52 of the downstream connection member 16. The first annular member 152 includes a radially inwardly extending flange portion 158 adjacent the end 154. A surface 159 on the flange portion 158 is spaced from the exterior surface of the valve ball 26 as clearly illustrated therein.

Slidingly positioned in the first annular member 152 is a second annular member 160 that has an outer peripheral portion 162 fitting closely within the first annular member 152. The second annular member 160 includes a surface 164 that is configured to engage the exterior surface of the valve ball 26.

The resilient seal member 64 is located in the seal assembly 150 and includes the surface 78 thereon, as previously described, that is in sealing engagement with the exterior surface of the valve ball 26. It will be noted in FIG. 3 that the valve ball 26 is in the open position and that the seal member 64 has sufficient volume so that it protrudes from the first and second annular members 152 and 160, respectively to hold the valve ball 26 in a position wherein it is spaced approximately 5/1000 to 10/1000 of an inch from the surface 164 on the second annular member 160. It will also be noted in FIG. 3 that a surface 170 on the second annular member 160 is spaced slightly from the end face 52 of the downstream connection member 16 when the valve ball 26 is in the open position and centered in the valve body 12a.

It should also be pointed out that the seal member 64 does not have sufficient volume to completely fill all the area defined by the exterior surface of the valve ball 26 and by the first and second annular members 152 and 160, respectively, for purposes that will become more apparent hereinafter. The seal members 64 is preferably constructed from a relatively soft, yet, resilient material that will respond to fluid pressure in the valve 10a.

As previously mentioned, when the valve 10a is in the open position, that is, when the valve ball 26 is positioned so that the port 28 extending therethrough is arranged as shown in FIG. 3, the surface 78 on the seal member 64 engages the exterior surface of the valve ball 26, holding the valve ball 26 centered in the valve body 12a and away from the surface 164 on the second annular member 160.

Rotating the valve ball 26 to the closed position, that is, to a position wherein the port 28 is positioned as illustrated in FIG. 3A, fluid pressure exerted through the inlet (not shown) of the valve 10a forces the valve ball 26 relatively downstream until the exterior surface of the valve ball 26 engages the surface 164 on the second annular member 160.

The downstream movement of the valve ball 26 continues, if the fluid pressure is sufficiently high, carrying the seal member 64 and the second annular member 160 therewith until the surface 170 on the second annular member 160 engages the end face 52 of the downstream connection member 16. When the surface 170 engages the end face 52, the downstream movement of the valve ball 26 is arrested.

Fluid pressure in the bore 22a of the valve body 12a is exerted on the seal member 64 through the space between the flange 158 on the first annular member 152 and the valve ball 26, whereupon the seal member 64 is deformed into tight sealing engagement with the exterior surface of the valve ball 26. Stated in another way, the seal member 64 is responsive to the fluid pressure in the valve body 12a and is deformed thereby into tighter sealing engagement with the valve ball 26, thereby augmenting the initial seal formed between the surface 78 on the seal member 64 and the valve ball 26. From the foregoing, it can be appreciated that while limited movement of the valve ball 26 is permitted, an effective fluid-tight downstream seal is formed in the valve ball and the seal formed is augmented by the force of fluid pressure coupled with the pressure responsive characteristics of the seal member 64.

The annular members 152 and 160 cannot become cocked in the valve body 12a, therefore, the valve ball 26 is not subject to binding. This is apparent in FIG. 3A since the first annular member 152 is securely retained between the shoulder 102 in the valve body 12a and the end face 52 of the downstream connection member 16. Also, it will be noted that the second annular member 160 is slidingly positioned in the first annular member 152 and is supported by the end face 52 when a maximum axial load is exerted thereon.

It will be understood that the seal member located in the upstream seal assembly (not shown) is retained therein by the radial flange 158 since the upstream seal assembly is constructed identical to the downstream seal assembly 150. Also, the seal member 64 located in the downstream seal assembly 150 cannot be extruded from the seal assembly 150 due to the engagement of the exterior surface of the valve ball 26 with the surface 164 on the second annular member 160.

*Embodiment of FIG. 4*

The fragmentary, cross-sectional view of FIG. 4 illustrates a modified form of the valve 10 that is generally designated by the reference character 10b. Identical parts utilized in the valve 10b are indicated by the same reference characters used in describing the embodiment of FIGS. 1 through 3A.

As illustrated clearly in FIG. 4, the valve 10b includes a valve body 12b having an upstream end face 18b that is in engagement with the end face 48 of the upstream connection member 14 and an end face 20b that is in engagement with the end face 52 on the downstream connection member 16. The valve body 12b includes a bore 22b extending therethrough and intersecting the end faces 18b and 20b. A counterbore 200 is provided in the valve body 12b adjacent the end face 18b and forms an annular shoulder 202 therein. A counterbore 204 is formed in the valve body 12b adjacent the downstream end face 20b and forms an annular shoulder 206 therein.

An upstream seal assembly 208 is disposed in the counterbore 200 and a downstream seal assembly 210 is disposed in the counterbore 204. As clearly illustrated in FIG. 4, the seal assemblies 208 and 210 are identical in construction though oppositely disposed in the valve 10b. Only the upstream seal assembly 208 will be described in detail, it being understood that similar parts on the downstream seal assembly 210 will be designated by the same reference characters.

The upstream seal assembly 208 includes a first annular member 212 that is in engagement with the annular shoulder 202. The first annular member 212 has a surface 214 thereon that is engageable with the exterior surface of the valve ball 26. An aperture 216 extends through the first annular member 212 for purposes that will become more apparent hereinafter.

The upstream seal assembly 208 also includes a second annular member 218 that is generally U-shaped in cross section and is sized to receive the resilient annular seal member 64. The second annular member 218 includes a surface 220 that is arranged to supportingly engage the exterior surface of the valve ball 26, a surface 222 that is in engagement with the end face 48 of the upstream connection member 14 and an end surface 224 that is in engagement with the first annular member 212.

An annular recess 226 is formed in the second annular member 218 adjacent the first annular member 212. The recess 226 is in communication with the aperture 216.

As clearly illustrated in FIG. 4, the seal assembly 208 is retained in position in the valve 10b between the annular shoulder 202 and the end face 48 on the upstream connection member 14. It should also be pointed out that the load exerted on the valve 10b when the threaded fasteners 82 (see FIG. 1) are tightened is carried as a pure compressive load by the valve body 12b through the engagement of the end faces 18b and 20b with a respective end face 48 and 52 on connection members 14 and 16.

As previously described, the resilient annular seal 64 includes a surface 78 that is in sealing engagement with the exterior surface of the valve ball 26. Also as previously mentioned, the cross-sectional area of the seal member 64 is slightly less than the area encompressed by the first and second annular members 212 and 218, respectively, and by the exterior surface of the valve ball 26 to permit the seal member 64 to be deformed relatively into the seal assembly.

The seal member 64 is arranged to center the valve ball 26 when the valve ball 26 is in the open position. When in the centered position (not shown), the space between the surface of the valve ball 26 and the surfaces 214 and 220 is preferably 5/1000 to 10/1000 of an inch.

Operatively, the ball valve 10b functions in precisely the same manner as did the valves 10 and 10a as described in connection with FIGS. 1, 1A and 2. However, it will be noted that the provision of the annular recess 226 in the downstream seal assembly 210 permits a small amount of deformation of the seal member 62 to avoid pinching or shearing of the surface 78 during rotation of the valve ball 26. The aperture 216 that is in communication with the annular recess 226 prevents the entrapment of pressure therein which might otherwise oppose the deformation of the seal member 64.

It will be noted in FIG. 4 that the surfaces 220 on the second annular member 218 and the surface 214 on the first annular member 212 engage and support the valve ball 26 to terminate movement thereof, when in the closed position, toward the downstream connection member 16. The annular members 212 and 218 are securely held against movement or deformation in the valve body 12b by the engagement of the two members and their engagement with the shoulder 206 and the end face 52 of the downstream connection member 16. Thus, there is no possibility that the annular members 212 and 218 will become cocked and bind the ball valve in any operational position thereof.

It is apparent in FIG. 4 that a fluid-tight downstream seal is formed between the surface 78 on the seal member 64 and the exterior surface of the valve ball. Also, an upstream seal is maintained between the surface 78 on the seal member 64 located in the upstream seal assembly 208 due to the small amount of movement of the valve ball 26. Should the seal members 64 become defective for any reason, a secondary seal is formed between the surfaces 214 and 220 and the exterior surface of the valve ball 26 as previously described.

Figure 5:
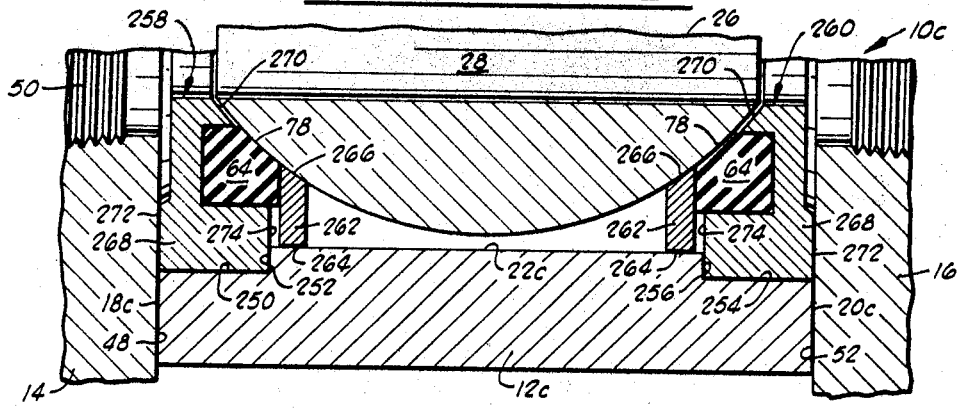
FIG. 5 is an enlarged, fragmentary cross-sectional view similar to FIG. 4, but illustrating still another embodiment of seal that is also constructed in accordance with the invention; and, FIG. 5A is an enlarged, fragmentary cross-sectional view similar to FIG. 5, but illustrating the valve ball in the closed position and shifted relatively downstream.

*Embodiment of FIG. 5*

The fragmentary, cross-sectional view of FIG. 5 illustrates a modified form of the valve 10 that is generally designated by the reference character 10c. Parts utilized in the valve 10c that are identical to previously described parts are designated by the same reference characters previously used.

As clearly illustrated in FIG. 5, the valve 10c includes a valve body 12c having an upstream end face 18c that is in engagement with the end face 48 of the upstream connection member 14 and an end face 20c that is in engagement with the end face 52 of the downstream connection member 16. The valve body 12c also includes a bore 22c extending therethrough and intersecting the end faces 18c and 20c.

A counterbore 250 is provided in the valve body 12c adjacent the end face 18c and forms an annular shoulder 252 therein. A counterbore 254 is formed in the valve body 12c adjacent the downstream end face 20c and forms an annular shoulder 256 therein.

An upstream seal assembly 258 is disposed in the counterbore 250 and a downstream seal assembly 260 is disposed in the counterbore 254. As clearly illustrated in FIG. 5, the seal assemblies 258 and 260 are identical in construction through oppositely disposed in the valve 10c. In view of the identity of construction of the seal assemblies 258 and 260, only the upstream seal assembly 258 will be described in detail. It will be understood similar parts on the downstream seal assembly 260 will be designated by the same reference characters.

The upstream seal assembly 258 includes a first annular member 262 that is disposed in the bore 22c. The first annular member 262 has an outer peripheral surface 264 that is sized to slidingly fit within the bore 22c. An inner perpiheral surface 266 on the first annular member 262 is configured to slidingly engage the exterior surface of the valve ball 26.

The upstream seal assembly 258 also includes a second annular member 268 that is generally U-shaped in cross-section and is sized to receive the resilient annular seal member 64. The second annular member 268 includes a surface 270 that is arranged to supportingly engage the exterior surface of the valve ball 26, a surface 272 that is in engagement with the end face 48 on the upstream connection member 14, and an end surface 274 that is in engagement with the annular shoulder 252 in the valve body 12c.

As clearly illustrated in FIG. 5, the second annular member 268 is retained in position in the valve 10c between the end face 48 on the upstream connection member 14 and the annular shoulder 252 in the valve body 12c. The first annular member 262 is retained in position due to the sliding engagement between the outer peripheral surface 264 and the valve body 12c and the bore 22c and the inner peripheral surface 266 that is in engagement with the exterior surface of the valve ball 26.

It should also be pointed out that the load exerted on the valve 10c when the threaded fasteners 82 (see FIG. 1) are tightened is carried as a pure compressive load by the valve body 12c through the engagement of the end faces 18c and 20c with a respective end face 48 and 52 on the connection members 14 and 16.

As previously described, the resilient annular seal 64 includes a surface 78 that is in sealing engagement with the exterior surface of the valve ball 26. Also, the cross-sectional area of the seal member 64 is slightly less than the area encompassed by the first and second annular members 262 and 268, respectively, and by the exterior surface of the valve ball 26 to permit the seal member 64 to be deformed relatively into the seal assembly.

As illustrated in FIG. 5, the valve ball 26 is in the open position. When in this position, it will be noted that the valve ball 26 is held centered relative to the valve body 12c due to the engagement of the surfaces 78 on the resilient seal members 64 with the exterior surface of the valve ball. It should be pointed out that the space existing between the surfaces 270 on the seal assemblies 258 and 260 and the exterior surface of the valve ball 26 will be approximately 5/1000 to 10/1000 of an inch when the valve ball 26 is in the centered position.

Figure 5A:
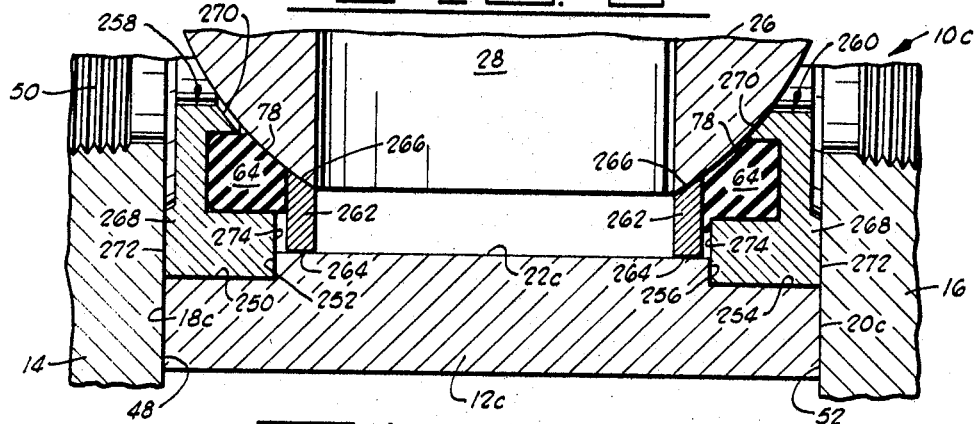

When the valve ball 26 is rotated to the closed position as illustrated in FIG. 5A, fluid pressure applied through the opening 50 in the upstream connection member 14 exerts a force on the valve ball 26 moving it relatively toward the downstream connection member 16. As the valve ball 26 moves relatively downstream, the first annular member 262 in the downstream seal assembly 260 is carried therewith engaging and deforming the seal member 64 therein into tighter sealing engagement with the valve ball 26.

When the valve ball 26 engages the surface 270 on the second annular member 268 in the downstream seal assembly 260, the movement thereof is terminated. In this position, as clearly shown in FIG. 5A, the first annular meber 262 does not engage the surface 274 on the second annular member 268 but is arrested with a small space existing therebetween. The space thus formed provides a small volume into which the seal member 64 can be partially displaced or deformed.

Any increase in fluid pressure occurring in the valve 10c acts upon the first annular member 262 in the downstream seal assembly 260 to exert a greater force on the seal member 64 thereby augmenting the seal formed between the surface 78 on the seal member 64 and the exterior surface of the valve ball 26.

As the valve ball 26 shifts relatively downstream fluid pressure acting on the seal member 64 in the upstream seal assembly 258 and the resiliency thereof maintains the surface 78 in sealing engagement with the exterior surface of the valve ball 26. Also, the first annular member 262 in the upstream seal assembly 258 is displaced relatively downstream by fluid pressure thus maintaining its engagement with the exterior surface of the valve ball 26 and thereby avoiding the possibility of cocking the first annular member 262 and binding the valve ball 26.

Similarly, no cocking of the first annular member 262 in the downstream seal assembly 260 can occur due to the constant engagement between the surface 266 thereon and the exterior surface of the valve ball 26 and the engagement between the outer peripheral surface 264 and the valve body 12c. Thus, the seal arrangement disclosed in the valve 10c functions to maintain a fluid-tight upstream and downstream seal with the valve ball 26, thereby assuring complete closure of the valve 10c while at the same time avoiding the possibility of cocking the first annular members 262 so that the valve ball 26 may be easily rotated in any operating position thereof.

In each of the embodiments of valve described hereinbefore, it is important to note that the bore extending through the valve body is either of a constant diameter or has an easily formed counterbore in each end thereof. It should also be noted that the annular members are of relatively simple configurations that can be formed by well known, inexpensive and quickly accomplished machining operations. Thus, the valves constructed in accordance with the invention may be quickly, easily and economically manufactured.

What I claim is:
1. A ball valve comprising:
 a valve body having an upstream end face, a downstream end face, and a bore extending therethrough intersecting said end faces;
 a valve ball movably positioned in said bore, said valve ball having a port therethrough and being rotatable between an open position wherein said port and bore are aligned and a closed position wherein said port and bore are disaligned;
 operating means operably connected with said valve ball for rotating said valve ball between the open and closed positions;
 a resilient, annular seal member disposed in said bore adjacent said downstream end face, and encircling a portion of said bore, said seal member having a surface engaging said valve ball;
 a first annular member engaging said valve body in said bore and engaging said seal member to prevent movement of said seal member into said bore;

a second annular member including an annular seat portion having a surface engageable with said valve ball upon deformation of said seal member, said second annular member engaging said seal member to prevent movement of said seal member out of said valve body; and, a flanged connection member having an end face and an opening extending therethrough intersecting said end face, said opening being aligned with said bore when said connection member is assembled with said valve, the end face on said connection member being arranged to engage said second annular member thereby preventing movement of said second annular member away from said valve body;

wherein said first annular member includes:
- an outer periphery sized to slidingly fit in said bore; and
- an inner peripheral surface slidingly engaging said valve ball to center said valve ball in said bore and to support said valve ball against movement along said bore when said first annular member engages said seal member, said first annular member being sized to engage both said ball and the walls of said bore without deformation of said seal member.

2. The valve of claim 1 wherein said inner peripheral surface is disposed in the same spherical plane as the surface on said second annular member when said ball engages said second annular member, whereby said ball is simultaneously supported by said inner peripheral surface and the surface on said second annular member.

3. The valve of claim 2 wherein said valve body includes a counterbore adjacent said downstream end face forming an annular shoulder therein and said second annular member is disposed in said counterbore in engagement with said shoulder and with the end face on said connection member.

4. A ball valve comprising:
a valve body having an upstream end face, a downstream end face, and a bore extending therethrough intersecting said end faces;
a valve ball movably positioned in said bore, said valve ball having a port therethrough and being rotatable between an open position wherein said port and bore are aligned and a closed position wherein said port and bore are disaligned;
operating means operably connected with said valve ball for rotating said valve ball between the open and closed positions;
a resilient, annular seal member disposed in said bore adjacent said downstream end face, and encircling a portion of said bore, said seal member having a surface engaging said valve ball;
a first annular member engaging said valve body in said bore and engaging said seal member to prevent movement of said seal member into said bore;
a second annular member including an annular seat portion having a surface engageable with said valve ball upon deformation of said seal member, said second annular member engaging said seal member to prevent movement of said seal member out of said valve body; and,
a flanged connection member having an end face and an opening extending therethrough intersecting said end face, said opening being aligned with said bore when said connection member is assembled with said valve, the end face on said connection member being arranged to engage said second annular member thereby preventing movement of said second annular member away from said valve body;
said first annular member including a radial flange portion disposed between and in engagement with the downstream end face of the body and the end face on the flanged connection member.

5. A ball valve comprising:
a valve body having an upstream end face, a downstream end face, and a bore extending therethrough intersecting said end faces;
a valve ball movably positioned in said bore, said valve ball having a port therethrough and being rotatable between an open position wherein said port and bore are aligned and a closed position wherein said port and bore are disaligned;
operating means operably connected with said valve ball for rotating said valve ball between the open and closed positions;
a resilient, annular seal member disposed in said bore adjacent said downstream end face, and encircling a portion of said bore, said seal member having a surface engaging said valve ball;
a first annular member engaging said valve body in said bore and engaging said seal member to prevent movement of said seal member into said bore;
a second annular member including an annular seat portion having a surface engageable with said valve ball upon deformation of said seal member, said second annular member engaging said seal member to prevent movement of said seal member out of said valve body; and
a flanged connection member having an end face and an opening extending therethrough intersecting said end face, said opening being aligned with said bore when said connection member is assembled with said valve, the end face on said connection member being arranged to engage said second annular member thereby preventing movement of said second annular member away from said valve body;
wherein:
said body has a counterbore in the downstream end thereof forming a shoulder facing the connecting member;
said first annular member extends from said shoulder to said connection member and has a length, as measured along said bore that is greater than the assembled length of said seal member and second annular member;
said seal member and second annular member are slidable in said first annular member in response to movement of said ball along said bore; and,
said seal member is responsive to fluid pressure in said bore whereby the engagement between said seal member and valve ball is enhanced when said second annular member engages the end face on said connection member.

6. A ball valve comprising:
a valve body having an upstream end face, a downstream end face, and a bore extending therethrough intersecting said end faces;
a valve ball movably positioned in said bore, said valve ball having a port therethrough and being rotatable between an open position wherein said port and bore are aligned and a closed position wherein said port and bore are disaligned;
operating means operably connected with said valve ball for rotating said valve ball between the open and closed positions;
a resilient, annular seal member disposed in said bore adjacent said downstream end face, and encircling a portion of said bore, said seal member having a surface engaging said valve ball;
a first annular member engaging said valve body in said bore and engaging said seal member to prevent movement of said seal member into said bore;
a second annular member including an annular seat portion having a surface engageable with said valve ball upon deformation of said seal member, said second annular member engaging said seal member to prevent movement of said seal member out of said valve body; and a flanged connection member having an end face and an opening extending therethrough intersecting said end face, said opening being aligned with said bore when said connection member is assembled with said valve, the end face on said connection member being arranged to engage said second annular member thereby preventing movement of said second annular member away from said valve body;

wherein said first annular member includes:
    a radial flange portion disposed between and in engagement with the downstream end face on said valve body and the end face on said connection member; and
    a seat portion having an inner peripheral surface thereon engageable with said valve ball upon deformation of said seal member, the surfaces on said first and second annular members being disposed in the same spherical plane whereby said ball is simultaneously engaged and supported thereby.

7. A ball valve comprising:
a valve body having an upstream end face, a downstream end face, and a bore extending therethrough intersecting said end faces;
a valve ball movably positioned in said bore, said valve ball having a port therethrough and being rotatable between an open position wherein said port and bore are aligned and a closed position wherein said port and bore are disaligned;
operating means operably connected with said valve ball for rotating said valve ball between the open and closed positions;
a resilient, annular seal member disposed in said bore adjacent said downstream end face, and encircling a portion of said bore, said seal member having a surface engaging said valve ball;
a first annular member engaging said valve body in said bore and engaging said seal member to prevent movement of said seal member into said bore;
a second annular member including an annular seat portion having a surface engageable with said valve ball upon deformation of said seal member, said second annular member engaging said seal member to prevent movement of said seal member out of said valve body; and
a flanged connection member having an end face and an opening extending therethrough intersecting said end face, said opening being aligned with said bore when said connection member is asembled with said valve, the end face on said connection member being arranged to engage said second annular member thereby preventing movement of said second annular member away from said valve body;
wherein:
    said valve body includes a counterbore adjacent said downstream end face forming an annular shoulder therein;
    said first annular member is disposed in said counterbore in engagement with said shoulder and includes an aperture therethrough and an inner peripheral surface disposed in the same spherical plane as the surface on said second annular member, whereby said surfaces simultaneously support said valve ball; and
    said second annular member is disposed in said counterbore in engagement with said first annular member and the end face on said connection member, said second annular member includes an annular recess adjacent said first annular member and seal member and in communication with said aperture to prevent damage to said seal member during rotation of said valve ball.

8. A ball valve comprising:
a valve body having an upstream end face, a downstream end face, and a bore extending therethrough intersecting said end faces;
a valve ball movably positioned in said bore, said valve ball having a port therethrough and being rotatable between an open position wherein said port and bore are aligned and a closed position wherein said port and bore are disaligned;
operating means operably connected with said valve ball for rotating said valve ball between the open and closed positions;
a pair of resilient annular seal members disposed in said bore adjacent said end faces, each seal member encircling a portion of the said bore and having a surface engaging said valve ball;
a pair of first annular members engaging said valve body in said bore, each member engaging a respective one of said seal members to prevent movement of said seal members into said bore;
a pair of second annular members, each including an annular seat portion having a surface thereon engageable with said valve ball upon deformation of said seal members, said second annular members engaging said seal members to prevent movement of said seal members out of said valve body; and,
a pair of flanged connection members, each having an end face and an opening extending therethrough intersecting said end faces, said openings being aligned with said bore when said connection members are assembled with said valve, the end faces on said connection members being arranged to engage a respective one of said second annular members to prevent movement of said second annular members away from said valve body;
each of said first annular members including:
    a radial flange portion disposed between and in engagement with a respective end face on said valve body and the adjacent end face on said connection members; and,
    a seat portion having an inner peripheral surface thereon engagebale with said valve ball upon deformation of said seal members, the surfaces on adjacent first and second annular members being disposed in the same spherical plane whereby said ball is simultaneously supported thereby.

9. A ball valve comprising:
a valve body having an upstream end face, a downstream end face, and a bore extending therethrough intersecting said end faces;
a valve ball movably positioned in said bore, said valve ball having a port therethrough and being rotatable between an open position wherein said port and bore are aligned and a closed position wherein said port and bore are disaligned;
operating means operably connected with said valve ball for rotating said valve ball between the open and closed positions;
a pair of resilient annular seal members disposed in said bore adjacent said end faces, each seal member encircling a portion of said bore and having a surface engaging said valve ball;
a pair of first annular members engaging said valve body in said bore, each member engaging a respective one of said seal members to prevent movement of said seal members into said bore;
a pair of second annular members, each including an annular seat portion having a surface thereon engageable with said valve ball upon deformation of said seal members, said second annular members engaging said seal members to prevent movement of said seal members out of said valve body; and
a pair of flanged connection members, each having an end face and an opening extending therethrough intersecting said end faces, said openings being aligned with said bore when said connection members are assembled with said valve, the end faces on said connection members being arranged to engage a respective one of said second annular members to prevent movement of said second annular members away from said valve body;

wherein:
said valve body includes a counterbore adjacent each said end face forming a pair of annular shoulders therein and said second annular members are disposed in a respective one of said counterbores in engagement with said shoulders and with an end face on the adjacent connection member; and each said first annular member includes:
an outer periphery sized to slidingly fit in said bore, and
an inner peripheral surface slidingly engaging said valve ball to center said valve ball in said bore and to support said valve ball against movement along said bore when said first annular members engage said seal members, said inner peripheral surfaces being disposed in the same spherical planes as the surfaces on adjacent second annular members, whereby said ball is simultaneously supported by said inner peripheral surface and the surface of the adjacent second annular member.

References Cited

UNITED STATES PATENTS

| | | | |
|---|---|---|---|
| 2,839,266 | 6/1958 | Kaiser | 251—315 X |
| 2,895,496 | 7/1959 | Sanctuary | 251—151 X |
| 2,940,725 | 6/1960 | Nagel | 251—317 |
| 3,067,977 | 12/1962 | Anderson et al. | 251—315 X |
| 3,083,945 | 4/1963 | Shafer et al. | 251—315 X |
| 3,174,495 | 3/1965 | Anderson et al. | 251—315 X |
| 3,177,887 | 4/1965 | Priese | 251—315 X |
| 3,184,213 | 5/1965 | Anderson | 215—315 X |
| 3,211,421 | 10/1965 | Johnson et al. | 251—315 |

FOREIGN PATENTS

| | | |
|---|---|---|
| 1,376,015 | 12/1964 | France. |
| 1,411,205 | 9/1965 | France. |

M. CARY NELSON, *Primary Examiner.*

M. O. STURM, *Assistant Examiner.*

U.S. Cl. X.R.

251—282